No. 811,898. PATENTED FEB. 6, 1906.
A. BILLSTEIN.
COLLAPSIBLE REEL.
APPLICATION FILED JULY 14, 1905.

Witnesses

Inventor
Aaron Billstein
Attorneys

UNITED STATES PATENT OFFICE.

AARON BILLSTEIN, OF BALTIMORE, MARYLAND, ASSIGNOR TO THE FRIEDENWALD COMPANY OF BALTIMORE CITY, OF BALTIMORE, MARYLAND, A CORPORATION OF MARYLAND.

COLLAPSIBLE REEL.

No. 811,898.     Specification of Letters Patent.     Patented Feb. 6, 1906.

Application filed July 14, 1905. Serial No. 269,695.

*To all whom it may concern:*

Be it known that I, AARON BILLSTEIN, a citizen of the United States, and a resident of Baltimore, Maryland, have invented certain new and useful Improvements in Collapsible Reels, of which the following is a specification.

The object of the present invention is to produce a reel which is suitable for receiving cord, tape, braid, and like articles, which is inexpensive, and which may be collapsed when not in use, and is thus especially adapted for shipping and storage.

The invention will be described in detail in connection with the accompanying drawings, in which—

Figure 1:
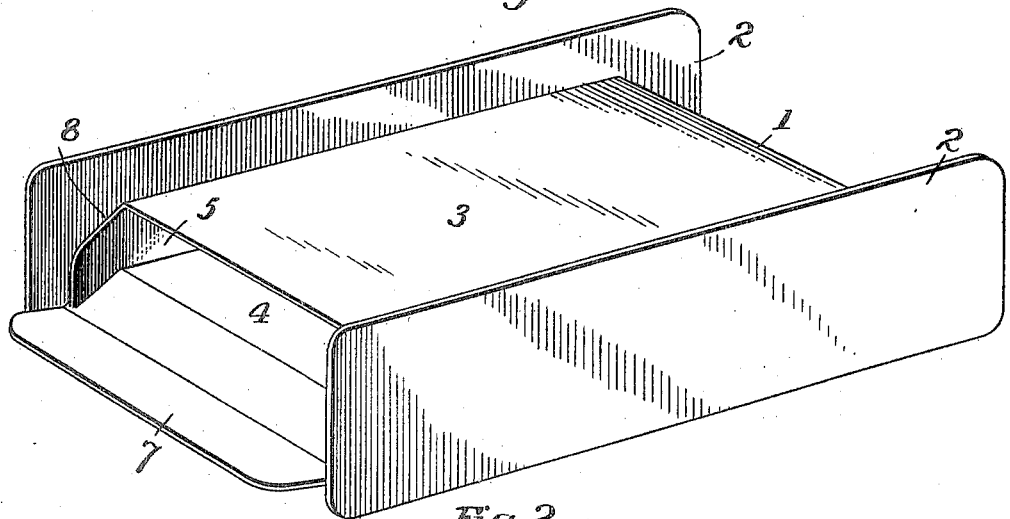
Figure 2:
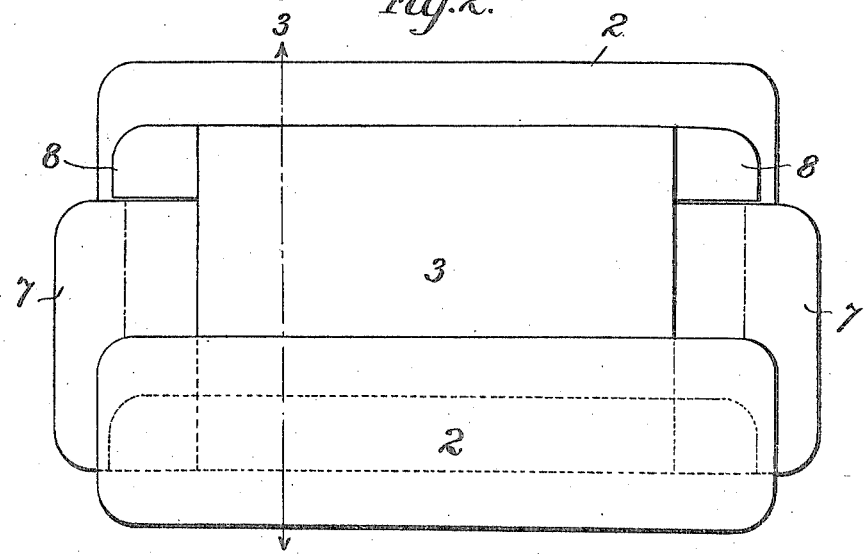
Figure 3:
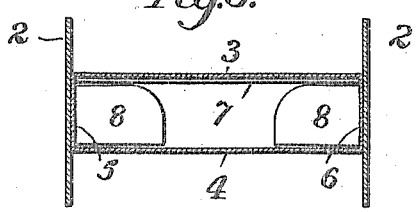
Figure 4:
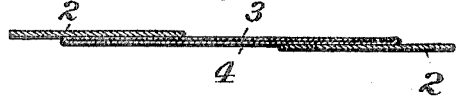

Figure 1 is a perspective view of a reel embodying the present invention. Fig. 2 is a plan view of the same collapsed. Fig. 3 is a section on the line 3 3, showing the reel as erected ready for use. Fig. 4 is a section on the line 3 3, showing the reel collapsed.

Referring to the drawings, it will be seen that my improved reel consists of a transverse tubular or box member 1 and two side plates or flange members 2. The box member 1 may be of any desired construction which permits of collapsing its upper side 3 upon its lower side 4, as indicated in Fig. 4.

As shown, the box member is rectangular, comprising the upper and lower sides 3 4, the right and left sides 5 6, the end flaps 7, and the ears 8. When the ears are turned in and the end flaps turned in with their tongues between the ears and the upper side 3, the box is held rigidly in rectangular form, as indicated in Fig. 3. When the end flaps and ears are withdrawn, the box may be collapsed, as shown in Figs. 2 and 4. It will be understood that any other rectangular collapsible box may be substituted as a transverse member for the reel. The side plates or flanges 2 2 of the reel are preferably permanently connected to the side members 5 6 of the box by some suitable means, such as glue, paste, or staples.

The box may be used as a receptacle for merchandise in addition to using the outside of the box as a reel. The main advantages of the invention are, however, the cheapness of the construction and the fact that it may be folded into a small compass for storage and shipment by bringing all of its members substantially into the same plane, while it may be quickly assembled for use. Both the box or middle member and the flange members are preferably constructed of paper-board, although either or both of them might be made of veneer or other suitable material.

It will be evident that the specific construction and design of my improved reel may be varied greatly within the limits of my invention.

Without limiting myself to the specific construction illustrated and described, I claim—

1. A reel comprising two flange members and an intermediate transverse member, the said reel being adapted to be erected and collapsed without disconnecting its members.

2. A reel comprising two flange members and an intermediate box member to the sides of which the flange members are connected, the said reel being collapsible without disconnecting the flange members from the box member.

3. A reel comprising two flange members and an intermediate folding box to which the flange members are permanently connected, the said box being collapsible, for the purpose set forth.

4. A reel comprising a rectangular folding box having a tubular body and end flaps adapted to inclose the space within the box, and two flange members permanently connected to opposite sides of the box, the said box and flange members being collapsible to bring all of the members thereof substantially into the same plane, for the purpose set forth.

In testimony whereof I have signed my name to this specification in the presence of two subscribing witnesses.

AARON BILLSTEIN.

Witnesses:
   J. J. WHITE,
   R. M. STEER.